United States Patent

[11] 3,624,126

[72] Inventor Venkatachala L. Narayanan
North Brunswick, N.J.
[21] Appl. No. 34,909
[22] Filed May 4, 1970
[45] Patented Nov. 30, 1971
[73] Assignee E. R. Squibb & Sons, Inc.
New York, N.Y.
Continuation-in-part of application Ser. No. 854,724, Sept. 2, 1969, now abandoned.
This application May 4, 1970, Ser. No. 34,909

[54] $\Delta^2$, $\alpha$-ADAMANTANE ACETIC ACID
4 Claims, No Drawings
[52] U.S. Cl.................................................. 260/468 B,
260/243 B, 260/247, 260/257 R, 260/268 TR,
260/293 DA, 260/294.7 B, 260/309, 260/310 R,
260/326.3, 260/326.5 B, 260/326.8, 260/326.85,
260/464, 260/465 R, 260/469, 260/514 B,
260/515 R, 260/544 L, 260/544 M, 260/557 B,
260/558 R, 260/563 P, 260/570.5 CA, 260/586 R,
260/590, 424/246, 424/250, 424/251, 424/267,
424/273, 424/274
[51] Int. Cl........................................................C07c 61/28,
C07c 69/74

[50] Field of Search............................................ 260/514,
468

[56] References Cited
UNITED STATES PATENTS
3,532,748 10/1970 Smith........................... 260/563

Primary Examiner—Lorraine A. Weinberger
Assistant Examiner—Robert Gerstl
Attorneys—Lawrence S. Levinson, Merle J. Smith, Theodore J. Criares, Donald J. Perrella and Burton Rodney ABSTRACT: 1-Azacyclopentano[1,2-a]adamantane compounds and derivatives thereof which have antiviral and anti-inflammatory properties and which are useful cardiovascular agents may be prepared starting from 2-adamantanones or substituted 2-adamantanones and proceeding through a series of intermediate compounds to the corresponding 1-azacyclopentano[1,2-a]-adamantanes. Derivatives may be obtained by reacting the latter with an alkyl or alkenyl halide, haloalkylamine or a haloalkyl substituted amine, a haloalkylcarboxylic acid, an aralkyl halide of up to 10 carbon atoms, or a haloalkyladamantylamine or haloalkyl substituted adamantylamine. The 2-adamantane alkylamine intermediates for the 1-azacyclopentano-[1,2-a]adamantane compounds also have antiviral and anti-inflammatory properties and are useful cardiovascular agents.

Δ, α-ADAMANTANE ACETIC ACID

This application is a continuation-in-part application of my copending application Ser. No. 854,724 filed Sept. 2, 1969 now abandoned.

The present invention relates to 1-azacyclopentano-[1,2-a]adamantanes.

It is an object of the present invention to provide 1-azacyclopentano[1,2-a]adamantane compounds and derivatives thereof which have antiviral and anti-inflammatory properties and which are useful cardiovascular agents. Another object is to provide a method for preparing these compounds. A further object is to provide new intermediates from which these compounds may be prepared. These and other objects of the present invention will be apparent from the following description:

SUMMARY OF THE INVENTION

This invention relates to new compounds of the formula

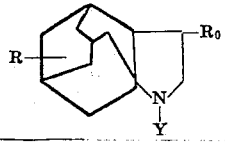

I wherein R may be hydrogen, or a lower alkyl or lower alkoxy radical having up to six carbon atoms, $R_0$ may be hydrogen, or an alkyl radical having up to six carbon atoms, and Y may be hydrogen, an alkyl or alkenyl radical having up to six carbon atoms, an aralkyl radical of up to ten carbon atoms, an alkyl carboxylic acid of the formula $-(CH_2)_nCO_2H$ wherein $n$ is 1 to 5, or an alkyl amine or N-substituted alkyl amine of the formula

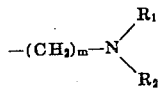

wherein $m$ is 2 to 5. $R_1$ and $R_2$ may be the same or different and may be hydrogen, lower alkyl or alkenyl radical of up to six carbon atoms, or one of $R_1$ or $R_2$ may be an adamantyl or substituted adamantyl radical, and $R_1$ and $R_2$ taken together may be a five to seven membered heterocyclic radical having not more than 12 carbon and hetero atoms.

DETAILED DESCRIPTION

The 1-azacyclopentano[1,2-a]adamantane compounds and derivatives thereof of the present invention may be prepared in a series of steps starting with an adamantyl ketone or an alkyl- or alkoxy-substituted adamantyl ketone. The starting ketone may be derived from the corresponding 1-hydroxyadamantane, that is 1-hydroxyadamantane itself, or alkyl- or alkoxy-substituted 1-hydroxyadamantane. According to one reaction sequence, an adamantyl ketone of formula II may be converted to the ethyl ester of $\Delta^2$,α-adamantane acetic acid by reaction with triethyl phosphonacetate and sodium hydride in an inert solvent such as, for example, 1,2-dimethoxyethane to give the compound of formula III. The use of a reactant such as triethyl phosphonacetate will result in a five-membered heterocyclic ring in subsequent compounds XII and XIII.

If it is desired to substitute an alkyl radical of up to six carbon atoms, $R_3$, for hydrogen, reaction of II with an alkyl substituted triethyl phosphonacetate in an inert solvent such as, for example, 1,2-dimethoxyethane, dimethylformamide, or benzene in the presence of a base such as, for example, sodium hydride (NaH) or potassium tertiary butoxide (K-t-butoxide) yields the corresponding alkyl-substituted $\Delta^2$,α-adamantane acetic acid ethyl ester IV. Heating a compound of type III or IV with alcoholic sodium or potassium hydroxide solution yields $\Delta^2$,α-adamantane acids of formula V.

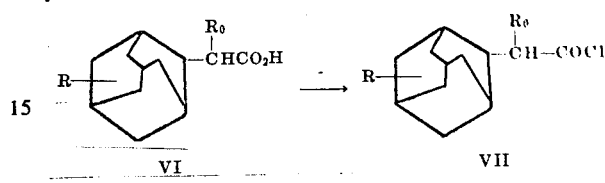

Catalytic reduction of V using Pt or Pd as catalyst yields an acid of formula VI. Compounds of type VI may be converted to an acid chloride of formula VII by treating with thionyl chloride or oxalyl chloride in a solvent such as, for example, benzene or chloroform.

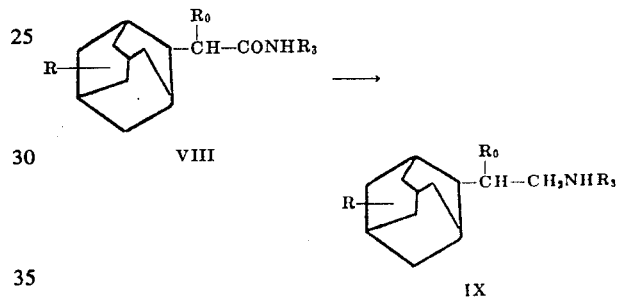

$R_3$ = lower alkyl of up to 6 carbons.

Reaction of VII with a lower alkyl amine gives an amide of formula VII. Reduction of VIII with lithium aluminum hydride in inert solvents such as, for example, tetrahydrofuran, yields an amine of formula IX.

Treatment of IX with a halogenating agent such as N-chlorosuccinamide in an inert solvent such as, for example, ether, or with dilute sodium hypochlorite solution yields an N-chloro-N-alkyl-2-adamantaneethylamine of formula X. Photolysis of a compound of formula X in sulfuric acid or a mixture of sulfuric and acetic acids at 0–20° for 0.5–3 hours using mercury vapor lamp yields a 1-chloro-N-alkyl-2-adamantaneethylamine of formula XI. Ring closure of XI is achieved by heating at 150°–220° for 4–12 hours in an inert atmosphere, to give Compound XII. Compound XII is then dealkylated to yield a compound of formula XIII by treatment with cyanogen bromide in an inert solvent such as, for example, chloroform or benzene.

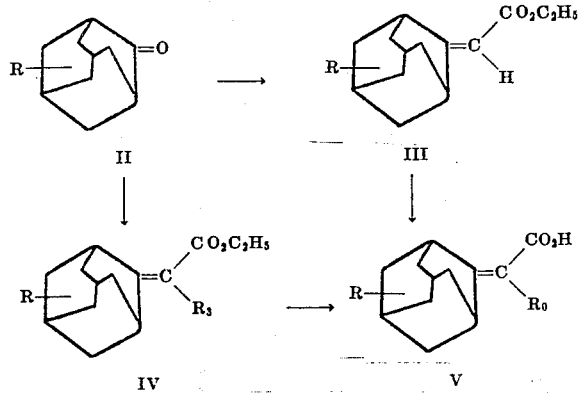

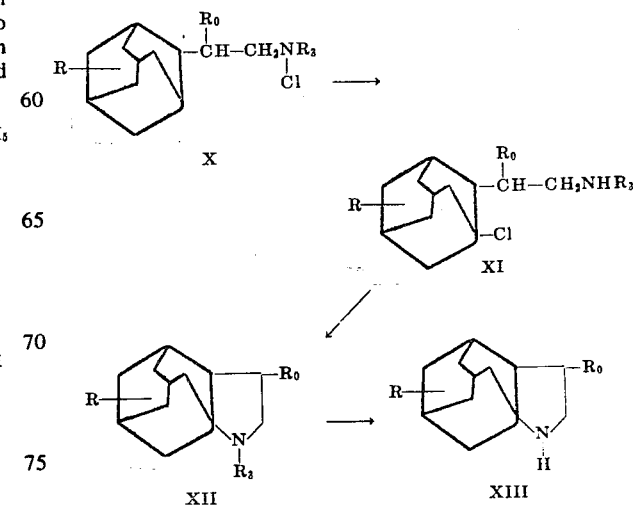

The 1-azacyclopentano[1,2-a]adamantane compound of formula XIII may then be reacted with an alkyl or alkenyl halide of the formula $R_5X$ wherein $R_5$ has up to six carbon atoms, or an aralkyl halide of up to ten carbon atoms, or with a haloalkyl carboxylic acid of the formula $X(CH_2)_nCO_2H$ wherein n is 1 to 5 or with a haloalkyl amine of the formula

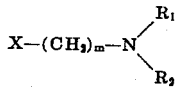

wherein m is from 2 to 5. The alkyl or alkenyl radical may be introduced by reacting an alkyl or alkenyl halide having the formula $R_5X$ with the compound of formula XIII wherein $R_5$ is a lower alkyl or lower alkenyl radical and X may be chlorine, bromine or iodine. Examples of such lower alkyl radicals are methyl, ethyl, n-propyl, i-propyl, n-butyl, i-butyl, n-pentyl, 2-methyl-n-pentyl, 3-methyl-n-pentyl, 2,2-dimethyl-n-butyl and 2,3-dimethyl-n-butyl. Examples of lower alkenyl radicals are allyl, alkyl-substituted allyl, such as methallyl, ethallyl and the like. This reaction may be carried out in bases like NaH, K-t-butoxide, or $NaNH_2$ in such solvents as, for example, benzene or dimethylformamide. Alternatively the compound of formula XIII may be acylated using an acylating agent such as an acid, or acid halide, of up to six carbon atoms under the same conditions followed by reduction to convert the amide carbonyl group to a methylene group.

When it is desired to produce compounds wherein Y is an alkyl carboxylic acid, the compound of formula XIII is reacted with a haloalkyl carboxylic acid having the formula $X(CH_2)_nCO_2H$ wherein X is Cl, Br or I, preferably Br. This reaction may be carried out using basic catalysts like NaH or K-t-butoxide, $NaNH_2$ or NaOH, in such solvents as, for example, benzene or dimethylformamide. Alternatively, a haloalkyl nitrile having the formula $X(CH_2)_nCN$ or a haloalkyl ester having the formula $X(CH_2)_nCO_2R_6$, wherein X has the same meaning as above and $R_6$ is a hydrolyzable alkyl radical of up to 18 carbon atoms, may be used followed by hydrolysis using conventional techniques to yield the free acid.

In the case of the haloalkylamine, $R_1$ and $R_2$ may be the same or different and may be hydrogen, a lower alkyl or lower alkenyl radical of up to six carbon atoms, the nitrogen atom may join with the groups represented by R1 and R2 to form a five to seven member heterocyclic radical having not more than 12 carbon and hetero atoms in the radical, which additionally may contain an oxygen, sulfur or a second nitrogen atom, but not more than a total of two hetero atoms. The five to seven member heterocycles may include, for example, the following radicals: piperidino, (lower alkyl)piperidino, e.g., methylpiperidino, di(lower alkyl)piperidino, e.g., dimethylpiperidino, (lower alkoxy)piperidino, e.g., methoxypiperidino, pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, morpholino, (lower alkyl)morpholino, e.g., N-methylmorpholino and 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., N-methylthiamorpholino and 2-methylthiamorpholino, di(lower alkyl)thiamorpholino, e.g., 2,3-diethylthiamorpholino and 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, hydroxy lower alkyl piperazino, e.g., 4-(2-hydroxyethyl)piperazino, di(lower alkyl)piperazino, e.g., 2,3-dimethylpiperazino, hexamethyleneimino, and pyrrolo. One of $R_1$ or $R_2$ may be an adamantyl radical. The adamantyl radical may be unsubstituted or substituted by lower alkyl or lower alkoxy radicals of up to six carbon atoms. Examples of such lower alkyl radicals are methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl and 2,3-dimethyl-n-butyl.

According to a second reaction sequence, Compound II is converted to the corresponding $\Delta^2,\alpha$-adamantane acetonitrile XIV by reacting with diethyl cyanomethyl phosphonate and sodium hydride in an inert solvent such as, for example, 1,2-dimethoxyethane. Reaction of II with an alkyl-substituted diethyl cyanomethyl phosphonate and sodium hydride in an inert solvent such as, for example, 1,2-dimethoxyethane, dimethylformamide, or benzene in the presence of a base such as, for example, sodium hydride or K-t-butoxide, yields compounds of formula XV.

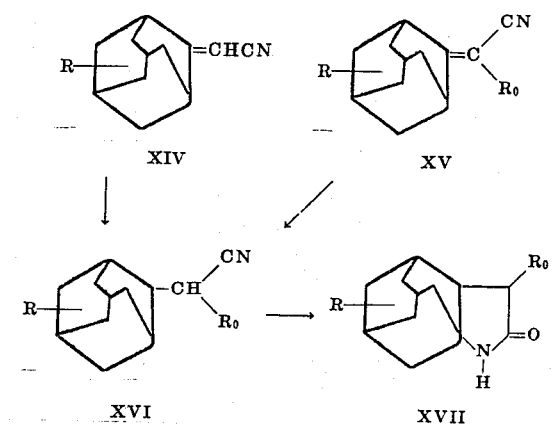

Catalytic hydrogenation of XV using Pt or Pd as catalyst yields XVI. Subjecting compound XVI to the Ritter reaction under acidic conditions in the presence of an alcohol like t-butanol yields XVII. The acidic catalysts that may be used are for example 95–98 percent $H_2SO_4$, acetic acid or trialkyloxonium salts. Reduction of XVII, for example by $LiAlH_4$, yields compounds of formula XIII.

In the compounds of the present invention, the substituent R may be hydrogen or a lower alkyl or lower alkoxy radical of up to six carbon atoms. Specific examples of lower alkyl and lower alkoxy radicals have been given above.

$R_o$ may be hydrogen or a lower alkyl radical of up to six carbon atoms. Specific examples of lower alkyl radicals have been given above. When $R_o$ is other than hydrogen, a lower alkyl-substituted triethylphosphonacetate is reacted with a compound of formula II.

The alkyl amine which is used to convert the acid halide of formula VII to the amide of formula VIII has the formula $R_3NH_2$. While any alkyl amine may be used, as a practical matter, as the alkyl substituent will be removed subsequently (in proceeding from the compound of formula XII to the compound of XIII), it is preferred to use inexpensive readily available amines. For this reason, the lower alkyl amines such as methylamine and ethylamine are preferred.

The compounds of formula IX wherein the substituent R occupies the 4-position, wherein R is H, lower alkyl or halogen (F,Cl,Br,I) are not only useful as intermediates for compounds of formulas X, XI, XII and XIII, but also have been found to possess anti-inflammatory activity, and thus are themselves end products of the invention together with the compounds of formula XIII. These compounds are prepared as described above starting with a 4-substituted-2-adamantanone of the formula IIa and proceeding in the manner described above for preparing compounds of formulas III (or IV), V, VI and VII, through the corresponding IIIa (or IVa), Va, VIa and VIIIa.

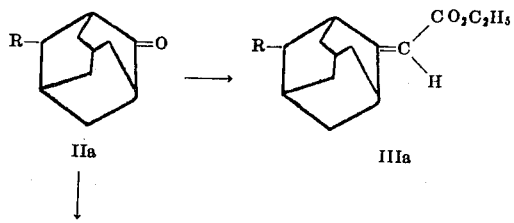

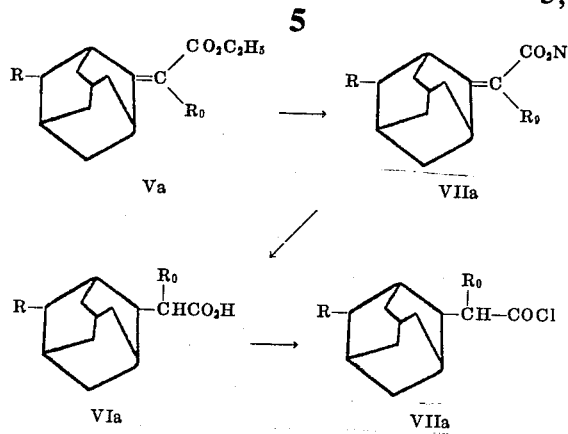

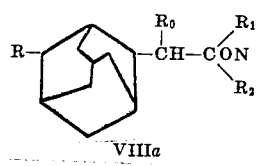

Reaction of VIIa with an alkyl amine of the formula

wherein $R_1$ and $R_2$ are as defined above gives an amide of the formula

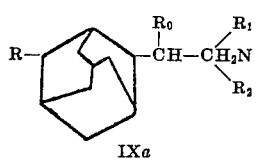

Reduction of VIIIa with lithium aluminum hydride in an inert solvent such as, for example, tetrahydrofuran, yields an amine of the formula

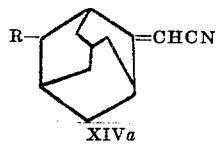

According to a second reaction sequence, compound IIa is converted to the corresponding $\Delta^2$,α-adamantane acetonitrile XIVa by reaction with diethylcyanomethylphosphonate and sodium hydride in an inert solvent such as, for example, 1,2-dimethoxyethane. Reaction of IIa with an alkyl-substituted diethyl cyanomethyl phosphonate and sodium hydride in an inert solvent such as, for example, 1,2-dimethoxyethane, dimethylformamide, or benzene in the presence of a base such as, for example, sodium hydride or K-t-butoxide, yields compounds of formula XVa. Catalytic hydrogenation of XVa using Pt or Pd as catalyst yields the compound of formula XVIa.

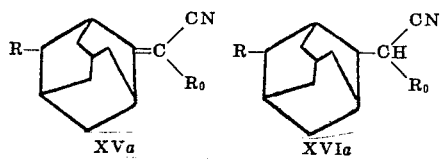

Hydrolysis of the compound of formula XVIa using a base like NaOH or KOH gives a compound of formula VIa. The compounds of formula IXa may be prepared from compounds of formula VIa as described above.

The acid of formula VIa may be subjected to homologation reaction to extend the length of the adamantane side chain, resulting in an acid of the formula

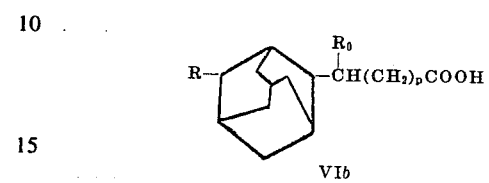

wherein $p$ is 1 or 2. The compound of VIb may then be treated as described above for VIa to yield a corresponding amine homolog of the formula

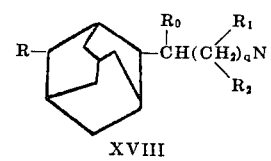

wherein $9$ is 2 or 3.

The following examples illustrate the present invention without, however, limiting the same thereto. All temperatures are given in degrees Centigrade.

While particular reactants and reactive steps are given above and in the following examples, it is to be understood that other reactants and reactions which give equivalent results may be employed in manner known to those skilled in the art.

EXAMPLE 1

1-Azacyclopentano[1,2-aadamantane
Step 1. 2-Adamantanone

A mixture of 100 ml. of concentrated $H_2SO_4$ and 24.6 g. (0.16 mole) of 1-hydroxyadamantane is heated with stirring on the steam bath for 4.5 hours. At the end of the period, the dark red solution is poured onto crushed ice, and the mixture extracted with 300 ml. of ether. After washing the ether layer to neutrality, it is dried ($MgSO_4$). Evaporation of the ether gives 15.0 g. (62 percent) of 2-adamantanone as a white solid. It is further purified by steam distillation followed by crystallization from cyclohexane; m.p. 260°–265°,$\lambda_{max}^{Nujol}$ 1,715 cm.$^{-1}$ (C=O). $\tau CDCl_3$ 7.3–8.6 (adamantyl protons).

Step 2 $\Delta^2$,α-Adamantaneacetic acid, ethyl ester

To a well-stirred suspension of 2.8 g. of sodium hydride dispersed in 75 ml. of dry 1,2-dimethoxyethane, 13.45 g. (0.06 mole) of triethyl phosphonoacetate are added dropwise at 20° (addition time 1 hour). After the addition, the mixture is stirred for an hour at room temperature. To the resulting yellow solution, a solution of 9.0 g. (0.06 mole) of 2-adamantanone in 75 ml. of dry 1,2-dimethoxyethane is added at such a rate as to maintain the temperature between 28°–30°. The mixture is then stirred overnight at room temperature. The mixture is concentrated, diluted with 100 ml. of water, and extracted with 3×300 ml. of ether. After drying ($MgSO_4$) the ether is removed in vacuo to give 10.3 g. (77 percent) of $\Delta^2$,α-adamantaneacetic acid, ethyl ester as a thick oil; λ max 5.83 μ (C=O); 6.08 μ (conjugated C=C). The crude product is used as such for the next step.

Step 3. $\Delta^2$,α-Adamantaneacetic acid

To a solution of 10.3 g. of the ethyl ester of Δ²,α-adamantaneacetic acid in 250 ml. of ethyl alcohol, 150 ml. of an aqueous KOH solution (25 percent) is added, and the mixture heated under reflux for 4 hours. The mixture is concentrated in vacuo, diluted with water and extracted with chloroform (200 ml.) to remove the insoluble impurities. The basic solution is cooled, acidified with 5 N HCl and the solid that separates is extracted with chloroform (3×250 ml.). The chloroform solution is washed with water, dried (MgSO₄) and evaporated in vacuo to give 6.8 g. (79 percent) of Δ²,α-adamantaneacetic acid as a brownish-white powder. It is crystallized from dilute acetone to give yellowish needles; m.p. 136°–138°, λNujol max 3.70–4.00, 5.90 and 6.1 μ.

Step 4. 2-Adamantaneacetic acid

A solution of 10 g. (0.05 mole) of Δ²,α-adamantaneacetic acid in aqueous alcoholic KOH is hydrogenated over 1 g. of 5 percent palladium on charcoal in a low-pressure Parr hydrogenator. The catalyst is filtered off, the filtrate cooled and acidified with concentrated HCl. Ethanol is removed in vacuo and the product extracted with CHCl₃, dried (MgSO₄) and evaporated to give 9.5 g. (94 percent) of white solid, m.p. 118°–120°. Recrystallization from pentane gives white crystals, m.p. 118°–120°, λNujol max, 3,70–4.00 μ 5.92 μ (C=O), none at 6.1 μ.

Step 5. N-Methyl-2-adamantane acetamide

A solution of 8.9 g. (0.046 mole) of adamantaneacetic acid is dissolved in 50 ml. of cold SOCl₂ and refluxed for 1 hour. The SOCl₂ is evaporated in vacuo to give 9.4 g. (97 percent of the acid chloride as a yellow oil. λ Nujol 5.5 μ (C=O).

To 10 ml. of 40 percent aqueous monomethylamine 9.4 g. (0.044 mole) of the acid chloride in 50 ml. of dry tetrahydrofuran (THF) is added dropwise. The mixture is stirred at room temperature for ½ hour, water (100 ml.) is added, and THF is evaporated in vacuo, followed by extraction with CHCl₃. The CHCl₃ extract is washed with 1 N HCl, followed by water, dried (MgSO₄) and evaporated to give 7.9 g. (86 percent) of white solid, m.p. 142°–149°. Recrystallization from acetonitrile gives white needles, m.p. 147°–150°; λNujol max, 6.05 μ (C=O), τ CDCl₃ 7.7 (NCH₃).

Step 6. N-Methyl-2-adamantaneethylamine, ethyl HCl

To a cooled suspension of 3 g. of lithium aluminum hydride (LAH) in 100 ml. of dry THF, 7.4 g. (0.036 mole) of N-methyl-2-adamantaneacetamide in 100 ml. of dry THF is added dropwise. The mixture is stirred and refluxed overnight. The mixture is cooled with a dry-ice bath, water added cautiously to decompose excess LAH, and 10 percent NaOH added until the precipitate is granular. The precipitate is filtered off and the THF evaporated in vacuo. The residue is extracted with CHCl₃, washed with water, dried (MgSO₄) and evaporated in vacuo to give 6.5 g. (94 percent) of oil. The hydrochloride salt is prepared and recrystallized from acetonitrile, m.p. above 270°; λ Nujol max, 3.7–4.2 μ (–NH⁺) (no C=O).

Step 7. 1-Chloro-N-methyl-2-adamantaneethylamine, hydrochloride

A solution of 15 g. (0.077 mole) of N-methyl-2-adamantaneethylamine, HCl NaOCl in 200 ml. of CH₂Cl₂ is vigorously stirred with 200 ml. of 5 percent aqueous NaOCl for 2 hours. The aqueous layer is removed, 200 ml. of fresh 5 percent NAOCl added, and the two-phase system stirred overnight. The CH₂Cl₂ layer is washed, dried (MgSO₄) and evaporated in vacuo to give 15.7 g. (90 percent of 1-chloro-N-methyl-2-adamantaneethylamine as an oil, IR has no strong –NH at 3.0 μ.

Step 8.

A solution of 15.7 g. of the above N-chloro amine in 192 ml. of acid solution (16.7 ml. of 95–98 percent H₂SO₄, 4.3 ml. of H₂0 and 171 ml. of HOAc) is placed in a photolytic cell cooled by circulating water. After 1 hour's exposure to the light source, the solution gives a negative test with KI solution. After cooling the solution is made alkaline with 10 percent NaOH, extracted with CHCl₃, washed with water, dried (MgSO₄)and evaporated to give 14 g. of the product as a yellow oil, λ max film, 3.0 μ (–NH).

Step 9. N-methyl-1-azacyclopentano[1,2-a]adamantane

1-Chloro-N-methyl-2-adamantaneethylamine (10 g.) is heated under nitrogen at 190°–195° for 12 hours. After cooling, the gummy solid is partitioned between ether and 2N-hydrochloric acid. The aqueous layer is separated, basified and extracted with ether. The ether layer is washed with water, dried (MgSO₄) and concentrated. The oily material is refluxed with 50 ml. of acetic anhydride for 1 hour. The excess acetic anhydride is removed in vacuo and the residue is partitioned between ether and 2N-hydrochloric acid. The aqueous layer is separated, basified and extracted with ether. The ether layer is dried (MgSO₄) and treated with ethereal HCl to give the amine hydrochloride. It may be recrystallized from ethanol-ether.

Step 10. 1-Azacyclopentano[1,2-a]adamantane

A solution of 2.0 g. of N-methyl-1azacyclopentano[1,2 a]adamantane in 20 ml. of benzene is added dropwise with stirring to a solution of 1.2 g. of cyanogen bromide in 20 ml. of benzene, and allowed to stand overnight. The residue left after evaporation of benzene is stirred with water and the solid collected. It is refluxed with an excess of hydrobromic acid for 2 hours. The excess of hydrobromic acid is then removed, the solid stirred up with water, basified and extracted with chloroform. The chloroform extract is dried (MgSO₄) and evaporated in vacuo to yield 1-azacyclopentano-[1,2-a]adamantane.

Step 11. N-(Dimethylaminoethyl)-1-azacyclopentano[1,2-a]adamantane

To a stirred solution of 3.4 g. (0.02 mole) of 1-azacyclopentano[1,2-a]adamantane in 100 ml. of benzene, a solution of 15 g. (0.1 mole) of 2-(dimethylamino)ethyl bromide in 200 ml. of benzene is added dropwise. After the addition, the reaction mixture is refluxed for 6 hours. The mixture is cooled, basified, and extracted with chloroform. Evaporation of the chloroform solution in vacuo yields N-(dimethylaminoethyl)-1-azacyclopentano[1,2-a]adamantane.

EXAMPLES 2–8

The procedure of example 1 is followed up to step 10 (compound of formula XIII) except that the starting material as shown in the formula is substituted. The subsequently obtained compound of formula XIII is correspondingly substituted

COMPOUND OF FORMULA II

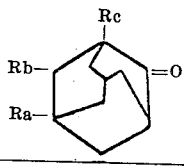

| Example: | Ra | Rb | Rc |
|---|---|---|---|
| 2 | CH₃— | H— | H— |
| 3 | H— | F | H— |
| 4 | H— | H— | C₃H₇— |
| 5 | ⟨phenyl⟩ | H— | H— |
| 6 | H | H— | CH₃O— |
| 7 | CH₃O— | H— | H— |
| 8 | H | CH₃ | H— |

EXAMPLES 9–16

The procedure of example 1 is followed up to step 10 (compound of formula XIII) except that the compound of formula II is reacted with an alkyl substituted triethylphosphonacetate in 1,2-dimethoxyethane solvent in the presence of sodium hydride to yield a compound of formula V wherein R₀ is the indicated alkyl radical. In the subsequently obtained compound of formula XIII, the radical R₀ is present as a substituent of the heterocyclic ring.

The alkyl substituent may be introduced into the triethylphosphonacetate by reacting the latter with an alkyl halide under the conditions described in example 46.

| | Alkyl radical of alkyl substituted triethylphosphonacetate | $R_o$ |
|---|---|---|
| Example: | | |
| 9 | Methyl | —CH$_3$ |
| 10 | Ethyl | —C$_2$H$_5$ |
| 11 | n-Propyl | —C$_3$H$_7$ |
| 12 | i-Propyl | CH$_3$CHCH$_3$ |
| 13 | n-Butyl | —C$_4$H$_9$ |
| 14 | n-Pentyl | —C$_5$H$_{11}$ |

| | Alkyl radical of alkyl substituted triethylphosphonacetate | $R_o$ |
|---|---|---|
| Example: | | |
| 15 | 2-Methyl butyl | —CH$_2$CHCH$_2$CH$_2$ <br>          CH$_3$ |
| 16 | n-Hexyl | —C$_6$H$_{13}$ |

EXAMPLES 17–45

The following compounds of formula XIII are reacted with the indicated halogenated compound to yield a compound of formula I wherein Y is the indicated radical:

| Example | Final product of example | Halogenated compound | Substituent Y in compound of Formula I |
|---|---|---|---|
| 17 | 1 | CH$_3$Cl | —CH$_3$ |
| 18 | 1 | CH$_3$CH$_2$Br | —CH$_2$CH$_3$ |
| 19 | 1 | CH$_3$CH$_2$CH$_2$Br | —CH$_2$CH$_2$CH$_3$ |
| 20 | 1 | CH$_3$CH$_2$CH$_2$CH$_2$I | —CH$_2$CH$_2$CH$_2$CH$_3$ |
| 21 | 2 | CH$_3$Br | —CH$_3$ |
| 22 | 4 | (CH$_3$)$_2$CHBr | —CH(CH$_3$)$_2$ |
| 23 | 5 | CH$_2$=CHCH$_2$I | —CH$_2$CH=CH$_2$ |
| 24 | 6 | CH$_2$=C(CH$_3$)—CH$_2$Br | —CH$_2$—C(CH$_3$)=CH$_2$ |
| 25 | 8 | BrCH$_2$CO$_2$H | —CH$_2$CO$_2$H |
| 26 | 10 | ClCH$_2$CH$_2$CO$_2$H | —CH$_2$CH$_2$CO$_2$H |
| 27 | 12 | ClCH$_2$CH$_2$N(H)(CH$_2$C$_6$H$_5$) | —CH$_2$CH$_2$N(H)(CH$_2$C$_6$H$_5$) |
| 28 | 13 | BrCH$_2$CH$_2$CH$_2$N(H)(CH$_3$) | —CH$_2$CH$_2$CH$_2$N(H)(CH$_3$) |
| 29 | 14 | BrCH$_2$CH$_2$N(CH$_3$)$_2$ | —CH$_2$CH$_2$N(CH$_3$)$_2$ |
| 30 | 1 | BrCH$_2$CH$_2$NH-(adamantyl) | CH$_2$CH$_2$NH-(adamantyl) |
| 31 | 1 | BrCH$_2$CH$_2$NH-(methyladamantyl) | CH$_2$CH$_2$NH-(methyladamantyl) |
| 32 | 1 | BrCH$_2$CH$_2$NH-(ethoxyadamantyl) | CH$_2$CH$_2$NH-(ethoxyadamantyl) |
| 33 | 1 | ClCH$_2$CH$_2$N(pyrrolidinyl) | —CH$_2$CH$_2$N(pyrrolidinyl) |
| 34 | 1 | ClCH$_2$CH$_2$N(piperidinyl) | —CH$_2$CH$_2$N(piperidinyl) |
| 35 | 1 | ClCH$_2$CH$_2$N(methylpiperidinyl) | —CH$_2$CH$_2$N(methylpiperidinyl) |

| Final product of example | Halogenated compound | Substituent Y in compound of Formula I |
|---|---|---|
| Example: | | |
| 36 | 1 ClCH$_2$CH$_2$N⟨ring⟩ | —CH$_2$CH$_2$N⟨ring⟩ |
| 37 | 1 ClCH$_2$CH$_2$N⟨ring⟩NCH$_3$ | —CH$_2$CH$_2$N⟨ring⟩NCH$_3$ |
| 38 | 1 ClCH$_2$CH$_2$N⟨ring⟩O | —CH$_2$—CH$_2$N⟨ring⟩O |
| 39 | 1 BrCH$_2$CH$_2$CH$_2$N⟨ring⟩NCH$_3$ | —CH$_2$CH$_2$CH$_2$N⟨ring⟩NCH$_3$ |
| 40 | 1 BrCH$_2$CH$_2$CH$_2$N⟨ring⟩—C$_2$H$_5$ | —CH$_2$CH$_2$CH$_2$N⟨ring⟩—C$_2$H$_5$ |
| 41 | 1 ClCH$_2$CH$_2$—⟨ring-CF$_3$⟩ | —CH$_2$CH$_2$—⟨ring-CF$_3$⟩ |
| 42 | 1 ClCH$_2$CH$_2$N⟨ring⟩—OCH$_3$ | —CH$_2$CH$_2$N⟨ring⟩—OCH$_3$ |
| 43 | 1 ClCH$_2$CH$_2$N⟨ring⟩S | —CH$_2$CH$_2$N⟨ring⟩S |
| 44 | 1 ClCH$_2$CH$_2$N⟨ring-N—CH$_3$⟩ | —CH$_2$CH$_2$N⟨ring-N—CH$_3$⟩ |
| 45 | 1 BrCH$_2$CH$_2$N⟨ring-N—CH$_3$⟩ | Same as above. |

EXAMPLE 46

$\Delta^2$,α-Ethyl-α-adamantaneacetic acid, ethyl ester

To a well-stirred suspension of 2.89 g. of sodium hydride dispersed in 75 ml. of dry 1,2-dimethoxyethane, 13.5 g. (0.06 mole) of triethylphosphonoacetate is added dropwise at 20° (addition time 1 hour). After the addition, the mixture is stirred for an hour at room temperature. To the resulting yellow solution, a solution of 6.6 g. (0.06 mole) of ethyl bromide in 50 ml. of 1,2-dimethoxyethane is added at room temperature and the solution heated at 50° for one hour. The resulting slurry is cooled to 10° and 2.8 g. of sodium hydride are added all at once. The solution is allowed to come slowly to room temperature during which time rapid evolution of gas takes place. After stirring the solution for 1 hour, a solution of 9.0 g. (0.06 mole) of adamantanone in 50 ml. of dry 1,2-dimethoxyethane is added and the solution heated at 50° for 3 hours. The reaction mixture is cooled, concentrated, diluted with 200 ml. of water, and extracted with 3×200 ml. of ether. After drying (MgSO$_4$) the ether is removed in vacuo to give $\Delta^2$,α-ethyl-α-adamantaneacetic acid, ethyl ester as a thick oil.

EXAMPLE 47

$\Delta^2$,α-Ethyl-α-adamantaneactic acid

Following the procedure of example 1, step 2, but substituting $\Delta^2$,α-ethyl-α-adamantaneacetic acid, ethyl ester for $\Delta^2$,α-adamantaneacetic acid, ethyl ester, there is obtained $\Delta^2$,α-ethyl-α-adamantaneacetic acid.

EXAMPLE 48

2-Adamantanepropionic acid

A solution 9.7 g. (0.05 mole) of 2-adamantaneacetic acid in 50 ml. of thionyl chloride is refluxed for 1 hour. The acid chloride obtained after the removal of the excess of thionyl chloride in vacuo is dissolved in 50 ml. of absolute ether. The ether solution is cooled to 5°–10°, and added to a cooled solution of diazomethane prepared from 35 g. of nitrosomethylurea in 500 ml. of ether. After several hours at 20°–25°, the ether is removed in vacuo. The solid diazoketone so obtained is dissolved in 100 ml. of dioxane and added dropwise with stirring to a mixture of 2 g. of silver oxide, 5 g. of anhydrous sodium carbonate, and 3 g. of sodium thiosulfate in 200 ml. of water at 50°–60°. Stirring is continued for 1 hour after addition is completed. The temperature of the mixture is then raised to 90°–100°. The solution is cooled, diluted with water, and acidified with dilute nitric acid. The resulting precipitate, 2-adamantanepropionic acid, is filtered and recrystallized from methanol-water.

EXAMPLE 49

2-Adamantanebutyric acid

The above procedure is repeated substituting 2-adamantanepropionic acid instead of 2-adamantaneacetic acid as the starting material. The product obtained is 2-adamantanebutyric acid.

EXAMPLE 50

A solution of 10 g. of the compound prepared as described in example 47 in aqueous alcoholic KOH is hydrogenated over 1 g. of 5 percent palladium on charcoal in a low-pressure Parr hydrogenator. The catalyst is filtered off, the filtrate cooled and acidified with concentrated HCl to yield α-ethyl-α-adamantaneacetic acid.

EXAMPLE 51

The compound of example 50 is treated according to the procedure of step 5 of example 1 to yield N-methyl-2-ethyl-2-adamantaneacetamide. Treatment of the latter compound according to the procedure of step 6 of example 1 yields N-methyl-2-ethyl-2-adamantaneethylamine, HCl.

EXAMPLES 52-59

The procedure of example 51 is repeated with the indicated starting material and amine to yield the corresponding amide and final amines:

| Starting material | Amine | Amine product |
|---|---|---|
| Compound of Example: | | |
| 50 | DMA | -CH(C₂H₅)-CH₂N(CH₃)(CH₃) on bicyclic ring |
| 48 | DEA | -CH₂CH₂CH₂N(C₂H₅)(C₂H₅) on bicyclic ring |
| 49 | Piperidine | -CH₂CH₂CH₂CH₂N-piperidyl on bicyclic ring |
| 50 | Morpholine | -CH(C₂H₅)CH₂N-morpholinyl on bicyclic ring |
| 48 | Pyrrolidine | -CH₂CH₂CH₂N-pyrrolidinyl on bicyclic ring |
| 49 | N-methylpiperazine | -CH₂CH₂CH₂CH₂N(piperazinyl)NCH₃ on bicyclic ring |
| 8 | (CH₃)(C₂H₅)NH | H₃C-[bicyclic]-CH₂CH₂N(CH₃)(C₂H₅) |
| 3 | CH₃NH₂ | F-[bicyclic]-CH₂CH₂N(H)(CH₃) |

The new products of the invention are useful as antiviral agents, for example, against influenza virus such as A-PR8 or hepatic virus such as MHV₃. They may be administered to a warm-blooded animal in accordance with this invention by any convenient route, including orally, or parenterally, that is, subcutaneously, intravenously, intramuscularly, or intraperitoneally. Administration can also be by vapor or spray through the mouth or nasal passages.

The dosage administered will be dependent upon the age, health and weight of the recipient, kind of concurrent treatment, if any, frequency of treatment, and the nature of the effect desired. Generally, a daily dosage of active ingredient compound will be from about 1 to 200 milligrams per kilogram of body weight, although lower, such as 0.5 milligram, or higher amounts can be used. Ordinarily, from 1 to 50, preferably 1 to 20, milligrams per kilogram per day in one or more applications per day is effective to obtain the desired result.

The compounds of the present invention can be employed in useful compositions according to the present invention by incorporating the free base or a physiologically acceptable salt thereof in such dosage forms as tablets, capsules, powder packets, or liquid solutions, suspensions, or elixirs, for oral administration, or liquid solutions for parenteral use, and in certain cases, suspensions for parenteral use (except intravenous since, of course, intravenous suspensions of any material are hazardous). In such compositions, the active ingredient will ordinarily always be present in an amount of at least 0.0001 percent by weight based on the total weight of the composition and not more than 99 percent by weight.

Besides the compounds of the present invention, the composition will contain a solid or liquid nontoxic pharmaceutical carrier for the active ingredient. Mixtures with one or more pharmaceutically active materials can of course be used.

In one embodiment of a pharmaceutical composition of this invention, the solid carrier is a capsule which can be of the ordinary gelatin type. In another embodiment, the active ingredient is tableted with or without adjuvants. In yet another embodiment, the active ingredient is put into powder packets. In these capsules, tablets, and powders the pharmaceutical carrier will generally constitute from about 5 to about 95 percent and preferably from 25 to 90 percent by weight. These dosage forms preferably contain from about 5 to 500 milligrams of active ingredient with from about 25 to 250 milligrams most preferred.

The pharmaceutical carrier can, as previously indicated, be a sterile liquid such as water and oils, including oils of petroleum, animal, vegetable or synthetic origin, for example, peanut oil, soybean oil, mineral oil, cod liver oil, and the like. In general, water, saline and aqueous dextrose (glucose) and related sugar solutions are preferred liquid carriers, particularly for injectable solutions. Sterile injectable solutions will ordinarily contain from about 0.5 to 25 percent, and preferably about 5 to 10 percent, by weight of the active ingredient.

As mentioned above, oral administration can be in a suitable suspension or syrup, in which the active ingredient ordinarily will constitute from about 0.5 to 10 percent, and preferably about 2 to 5 percent, by weight. The pharmaceutical carrier in such composition can be a watery vehicle such as an aromatic water, a syrup or a pharmaceutical mucilage.

Suitable pharmaceutical carriers are described in REMINGTON'S PRACTICE OF PHARMACY by E. W. Martin and E. F. Cook, a well-known reference text in this field.

The compounds of this invention are also useful as anti-inflammatory agents and are effective in the prevention and inhibition of granuloma tissue formation in warm-blooded animals, for example, in a manner similar to indomethacin. They may be used to decrease joint swelling, tenderness, pain and stiffness, in mammalian species, for example, in conditions such as rheumatoid arthritis. A compound of the invention may be compounded according to accepted pharmaceutical practice in oral dosage forms such as tablets, capsules, elixirs or powders for administration of about 100 mg. to 2 g. per day, preferably 100 mg. to 1 g. per day in two to four divided doses.

What is claimed is:

1. A compound having the formula

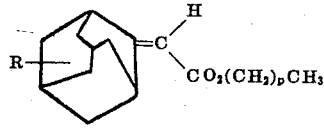

wherein R is hydrogen, or a lower alkyl or lower alkoxy radical of up to six carbon atoms and $p$ is an integer from 0 to 3.

2. A compound having the formula

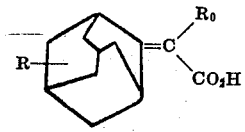

wherein R "is hydrogen or a lower alkyl or lower alkoxy radical of up to six carbon atoms and Ro is hydrogen or an alkyl radical of up to six carbon atoms."

3. A compound according to claim 1 having the name $\Delta^2$, $\alpha$-adamantaneacetic acetic acid, ethyl ester.

4. A compound according to claim 2 having the name $\Delta^2$, $\alpha$-adamantaneacetic acid.

* * * * *

UNITED STATES PATENT OFFICE
CERTIFICATE OF CORRECTION

Patent No. 3,624,126        Dated November 13, 1971

Inventor(s) Venkatachala L. Narayanan

It is certified that error appears in the above-identified patent and that said Letters Patent are hereby corrected as shown below:

Column 1, line 31, "-(CH2)" should read - - -(CH$_2$) - -.
Column 2, line 40, "VII." should read - - VIII. - -. Column 3, line 43, "R1" should read - - R$_1$ - -. Column 5, formula Va should read - - IVa - -; and formula VIIa should read - - Va - -; that part of formula VIIIa reading

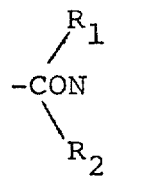           should read           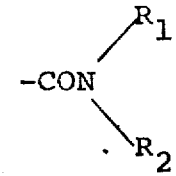   ;

and that part of formula IXa reading

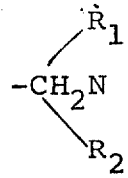           should read           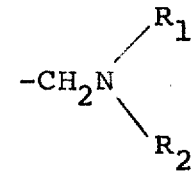   .

Column 6, formula XVIII, that part reading

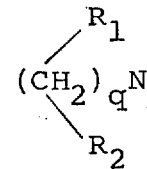           should read           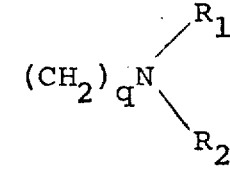   ;

line 34, "9" should read - - q - -; and on line 46, "[1,2-αadamantane" should read - - [1,2-α]adamantane - -.  Column 7, line 41, "adamantaneethylamine, ethyl HCl" should read - - adamantane ethyl amine, HCl - -; line 47, "LAIT" should read - - LAH --; line 58, "HCl NaOCl in" should read - - HCl in - -; line 61, "NAOCl" should read - - NaOCl - -; and on line 63, "90 percent of" should read - - (90 percent) of - -.

PO-1050
(5/69)

UNITED STATES PATENT OFFICE
CERTIFICATE OF CORRECTION

Patent No. 3,624,126               Dated November 13, 1971

Inventor(s)   Venkatachala L. Narayanan       PAGE - 2

It is certified that error appears in the above-identified patent and that said Letters Patent are hereby corrected as shown below:

Column 10, line 6, "$CH_2CH_2$" should read -- $CH_2CH_3$ --; Example 30, that part of the second formula reading Example 31, that part of the second formula reading

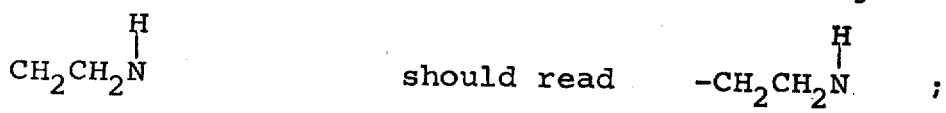

and in Example 32, that part of the second formula reading

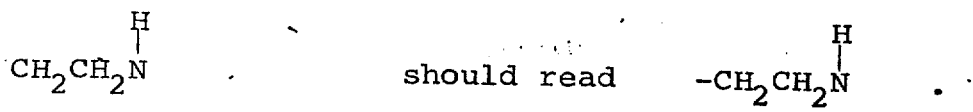

Column 14, before line 58 should be inserted --
The compounds of the present invention can be employed in useful compositions according to the present invention by incorporating the free base or a physiologically acceptable salt thereof in such dosage forms as tablets, capsules, powder packets, or liquid solutions, suspensions, or elixirs, for oral ad- --. Column 16, line 25, "R "is" should read -- R is --; and on line 27, "atoms."" should read -- atoms. --.

Signed and sealed this 30th day of May 1972.

(SEAL)
Attest:

EDWARD M. FLETCHER, JR.                ROBERT GOTTSCHALK
Attesting Officer                      Commissioner of Patents